United States Patent
Jinno et al.

(10) Patent No.: US 7,898,150 B2
(45) Date of Patent: Mar. 1, 2011

(54) ANGULAR VELOCITY DETECTION APPARATUS

(75) Inventors: Shingo Jinno, Nisshin (JP); Takayuki Shibata, Nisshin (JP)

(73) Assignee: DENSO CORPORATION, Kariya (JP)

(*) Notice: Subject to any disclaimer, the term of this patent is extended or adjusted under 35 U.S.C. 154(b) by 184 days.

(21) Appl. No.: 12/382,013

(22) Filed: Mar. 5, 2009

(65) Prior Publication Data
US 2009/0224629 A1  Sep. 10, 2009

(30) Foreign Application Priority Data
Mar. 7, 2008  (JP) ............................... 2008-057941

(51) Int. Cl.
H01L 41/107 (2006.01)
H03H 9/00 (2006.01)
H03H 9/25 (2006.01)
G01P 3/00 (2006.01)

(52) U.S. Cl. ............... 310/318; 310/313 R; 310/317; 310/319; 73/504.01

(58) Field of Classification Search ............ 310/313 R, 310/314, 317–319; 73/504.01, 504.02, 514.28
See application file for complete search history.

(56) References Cited

U.S. PATENT DOCUMENTS

| | | | |
|---|---|---|---|
| 4,065,789 A | 12/1977 | DeVries | |
| 6,516,665 B1* | 2/2003 | Varadan et al. | 73/504.01 |
| 6,984,332 B2* | 1/2006 | Varadan et al. | 216/2 |
| 7,520,184 B2 | 4/2009 | Uemura et al. | |
| 2009/0133495 A1* | 5/2009 | Arakawa et al. | 73/504.01 |

FOREIGN PATENT DOCUMENTS

| | | |
|---|---|---|
| JP | A-60-188809 | 9/1985 |
| JP | A-61-247914 | 11/1986 |
| JP | A-63-241308 | 10/1988 |
| JP | A-08-334330 | 12/1996 |
| JP | A-2000-171255 | 6/2000 |
| JP | 2005-308657 A | 11/2005 |

OTHER PUBLICATIONS

Varadan et al. "Design and development of a MEMS-IDT gyroscope." Sep. 6, 2000, Art Material Structure, vol. 9, pp. 898-905.
Varadan et al. "Design and development of MEMS-IDT gyroscope," Sep. 6, 2000, *Smart Materials and Structures*, vol. 9, pp. 898-905.
Notice of Reason for Refusal issued on Mar. 2, 2010 by the Japan Patent Office in corresponding Japanese Application No. 2008-057941 (English translation enclosed).
Notification of Reason for Refusal mailed on Jun. 8, 2010 issued from the Japanese Patent Office in the corresponding Japanese patent application No. 2008-057941 (with English translation).

* cited by examiner

*Primary Examiner*—Thomas M Dougherty
(74) *Attorney, Agent, or Firm*—Posz Law Group, PLC

(57) ABSTRACT

An angular velocity detection apparatus is disclosed. The angular velocity detection apparatus includes: a SAW angular velocity sensor; a synchronous detection unit configured to synchronously detect an output signal from the SAW angular velocity sensor by using a reference signal; and a switching signal generation unit. The switching signal generation unit cyclically switches on and off an input of a driving signal to the SAW angular velocity sensor, and switches on an input of the output signal to the synchronous detection unit when an unwanted wave is un-inputted to a sensing electrode of the SAW angular velocity sensor.

8 Claims, 4 Drawing Sheets

ANGULAR VELOCITY DETECTION APPARATUS

CROSS REFERENCE TO RELATED APPLICATION

The present application is based on Japanese Patent Application No. 2008-57941 filed on Mar. 7, 2008, the disclosure of which is incorporated herein by reference.

BACKGROUND OF THE INVENTION

1. Field of the Invention

The present invention relates to an angular velocity detection apparatus that detects an angular velocity using a surface acoustic wave angular velocity sensor.

2. Description of Related Art

There is known a surface acoustic wave angular velocity sensor for sensing an angular velocity based on a surface acoustic wave (cf. JP-A-H8-334330 and U.S. Pat. No. 6,516,665).

A surface acoustic wave (SAW) angular velocity sensor 2 is described below with reference to FIG. 6, as a related art. The SAW angular velocity sensor 2 includes: a piezoelectric single crystal substrate 3; and multiple perturbation weights 4 located on the substrate 3 and aligned in a square region. The SAW angular velocity sensor 2 further includes a comb electrode 6 for driving use (referred to hereinafter as a driving electrode 6), a comb electrode 8 for sensing use (referred to hereinafter as a sensing electrode 8), and reflectors 7, 9. The electrodes 6, 8 and the reflectors 7, 9 are located in a periphery of the multiple perturbation weights 4.

The driving electrode 6 faces a first side of the square region in which perturbation weights are located. The sensing electrode 8 faces a second side of the square region, which is orthogonal to the first side. The reflectors 7 are located so that the multiple perturbation weights 4 and the driving electrode 6 are between the reflectors 7 in the X-axis direction, as shown in FIG. 6. The reflectors 9 are located so that the multiple perturbation weights 4 and the sensing electrode 8 are between the reflectors 7 in the Y-axis direction, as shown in FIG. 6.

In the above SAW angular velocity sensor, application of a signal (i.e., driving signal) with a resonance frequency (e.g., 10 MHz to several 100 MHz) to the driving electrode 6 leads to generation of a surface acoustic wave (SAW). The resonance frequency is determined from a comb pitch of the driving electrode 6.

The generated SAW is confined by the reflectors 7 such that the SAW propagates back and forth along the X-axis direction in a region between the reflectors 7. Thus, a first standing wave is created in the region between the reflectors 7. A pitch of the multiple perturbation weights is determined in accordance with a wavelength of the first standing wave such that the multiple perturbation weights are located at anti-nodes of the first standing wave. Thus, each perturbation weight 4 vibrates at a position where the first standing wave has maximum amplitude. In the above, "the anti-node of standing wave" means a position where a vibration component perpendicular to a substrate surface becomes maximum.

The multiple perturbation weights 4 are arranged in a zig-zag pattern such that perturbation weights 4 are adjacent to each other in a direction parallel to a diagonal of the square region. Perturbation weights 4 adjacent to each other are located at positions where displacements caused by the first standing wave are in anti-phase.

As shown in FIG. 7, the perturbation weight 45 and the perturbation weights 41 to 44 surrounding (i.e., adjacent to) the perturbation weight 45 vibrate in anti-phase. When the driving signal is applied to the driving electrode 6, the first standing wave is generated in the X-axis direction, and the perturbation weight 4 vibrates and has a vibration velocity V in the Z-direction. Under the above state, if the substrate is subjected to an angular velocity $\Omega_x$ around the X-axis direction, each perturbation weight 4 is subjected to an acceleration $a = 2V \times \Omega_x$ due to a Coriolis force, which is proportional to the velocity V of the perturbation weight 4 and the angular velocity $\Omega_x$. Since the velocity V and the angular velocity $\Omega_x$ are vector quantities, a direction and a phase of the Coriolis force acting on the perturbation weight 45 are opposite to those acting on the perturbation weights 41 to 44 surrounding the perturbation weight 45. Note that the vector variables are shown as bold characters (e.g., $\Omega_x$) in the above notation.

The Coriolis force generates the vibration force acting on each perturbation weight in the Y-axis direction. The vibration force causes an acoustic wave in the Y-axis direction, which is orthogonal to the first standing wave in the x-axis direction. Since the perturbation weights 4 (e.g., the perturbation weights 41 and 42) are spaced apart from each other in the Y-axis direction by an integral multiple of the wavelength of the acoustic wave, and since the acoustic wave propagates back an forth in a region between the reflectors 9, a second standing wave is created in the region between the reflectors 9.

A magnitude of the second standing wave is proportional to the Coriolis force. Thus, to sense the angular velocity by using the SAW angular velocity sensor 2, one can apply the driving signal to the driving electrode 6 and measure an output (e.g., voltage, electric charge) from the sensing electrode 8.

The inventors clarify difficulties associated with the above SAW angular velocity sensor. The difficulties are described below, as a related art. According to a principal and a configuration of the above SAW angular velocity sensor 2, the first standing wave generated by the driving electrode 6 are scattered at the perturbation weights 4. Thus, even in a steady state with no angular velocity being applied, the sensing electrode 8 senses the scattered wave.

The scattered wave has a maximum displacement at a position of the perturbation weight 4 at a time when the perturbation weight 4 has a maximum displacement due to the first standing wave. Thus, the scattered wave and the first standing wave vibrate in phase. On the other hand, the second standing wave due to the Coriolis force has a maximum displacement at a time when the perturbation weight 4 has a zero displacement and a maximum vibration velocity due to the first standing wave. Thus, a phase of the second standing wave is different in generally 90 degrees from that of the first standing wave.

According to an idea of measuring an angular velocity using the SAW angular velocity sensor 2, a signal component representative of the Coriolis force or an angular velocity is extracted by synchronously detecting an output signal from the sensing electrode 8 by using a reference signal that corresponds to the driving signal.

The inventors however have found that, when an angular velocity is measured by synchronous detection utilizing a SAW angular velocity sensor, a detection result has a large error. Further, the inventors have revealed that reasons for the large error include the followings.

(1) The scattered wave propagating to the sensing electrode 8 is larger than a detection target wave due to Coriolis force by 6 orders of magnitude in voltage equivalent.

(2) Some vibration components directly propagate from the driving electrode 6 to the sensing electrode 8 (i.e., direct arrival wave). The direct arrival wave is larger than the detection target wave due to Coriolis force by 5 orders of magnitude in voltage equivalent at a portion where a distance between the driving electrode 6 and the sensing electrode 8 is minimum (e.g., 0.1 mm).

That is, in the SAW angular velocity sensor 2, an unwanted wave such as the scattered wave and the direct arrival wave becomes much larger than the wave due to the Coriolis force. In the above case, if a synchronous detection circuit is used for removing an unwanted wave signal component from the output signal of the sensing electrode 8, the synchronous detection circuit is saturated, and thus, the unwanted wave signal component cannot be removed.

SUMMARY OF THE INVENTION

In view of the above and other points, it is an objective of the present invention to provide an angular velocity detection apparatus that can detect an angular velocity with high accuracy while minimizing an influence of an unwanted wave such a scattered wave, a direct arrival wave or the like.

According to a first aspect of the present invention, an angular velocity detection apparatus is provided. The angular velocity detection apparatus includes a surface acoustic wave angular velocity sensor, which has: a piezoelectric substrate configured to allow a surface acoustic wave to propagate thereon; multiple perturbation weights disposed on the piezoelectric substrate; a driving electrode disposed on the piezoelectric substrate and configured to oscillate in accordance with a driving signal to vibrate the perturbation weights with a first vibration; a sensing electrode disposed on the piezoelectric substrate and configured to sense a second vibration of the perturbation weights, the second vibration being caused by a Coriolis force due to an angular velocity; and a first reflector and a second reflector between which the perturbation weights and the driving electrode are disposed. The angular velocity detection apparatus further includes: a driving signal generation unit configured to generate the driving signal; a synchronous detection unit configured to synchronously detect an output signal from the sensing electrode by using a reference signal; a reference signal generation unit configured to generate the reference signal; a first switching unit configured to connect and disconnect a first signal path for inputting the driving signal from the driving signal generation unit to the driving electrode by being switched on and off, respectively; a second switching unit configured to connect and disconnect a second signal path for inputting the reference signal from the reference signal generation unit to the synchronous detection unit by being switched on and off, respectively; and a switching signal generation unit. The switching signal generation unit generates: a first switching signal to cyclically switch on and off the first switching unit at predetermined time intervals; and a second switching signal to (i) switch on the second switching unit when a direct arrival wave from the driving electrode is un-inputted to the sensing electrode and (ii) switch off the second switching unit when the direct arrival wave from the driving electrode is inputted to the sensing electrode.

According to the above angular detection apparatus, it is possible detect an angular velocity with high accuracy while minimizing an influence of an unwanted wave.

According to a second aspect of the present invention, an angular velocity detection apparatus is provided. The angular velocity detection apparatus includes a surface acoustic wave angular velocity sensor, which has: a piezoelectric substrate configured to allow a surface acoustic wave to propagate thereon; multiple perturbation weights disposed on the piezoelectric substrate; a driving electrode disposed on the piezoelectric substrate and configured to oscillate in accordance with a driving signal to vibrate the perturbation weights with a first vibration; a sensing electrode disposed on the piezoelectric substrate and configured to sense a second vibration of the perturbation weights, the second vibration being caused by a Coriolis force due to an angular velocity; and a first reflector and a second reflector between which the perturbation weights and the driving electrode are disposed. The angular velocity detection apparatus further includes: a driving signal generation unit configured to generate the driving signal; a cancel signal generation unit configured to generate a cancel signal, wherein an unwanted signal component of an output signal from the sensing electrode and the cancel signal are generally opposite in phase and are generally equal in amplitude; an adder unit configured to configured add the cancel signal to the output signal, thereby to produce an added signal; a synchronous detection unit configured to synchronously detect the added signal by using a reference signal; and a reference signal generation unit configured to generate the reference signal.

According to the above angular detection apparatus, it is possible detect an angular velocity with high accuracy while minimizing an influence of an unwanted wave.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments are described below with reference to the accompanying drawings.

First Embodiment

Figure 1:
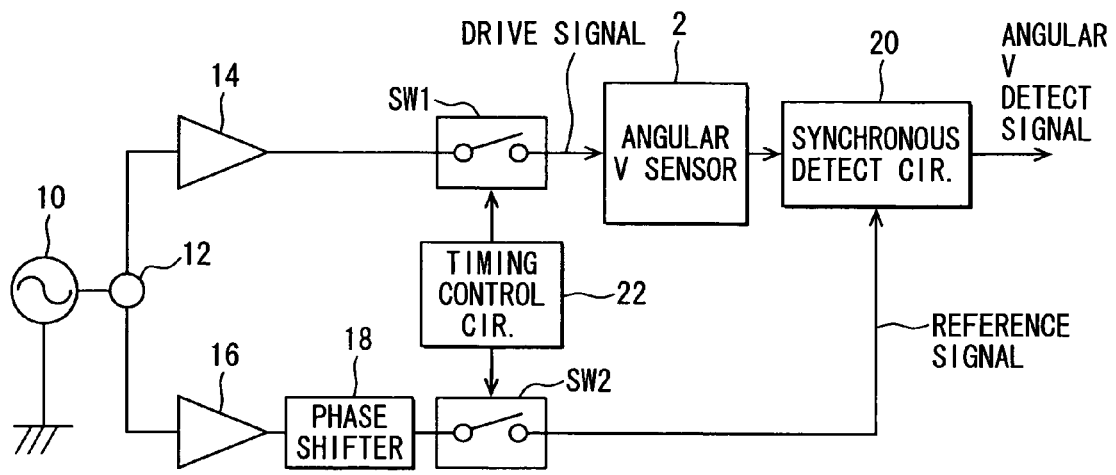
FIG. 1 is a block diagram illustrating an angular velocity detection apparatus in accordance with a first embodiment.

FIG. 1 is a block diagram illustrating an angular velocity detection apparatus in accordance with a first embodiment.

Figure 6:
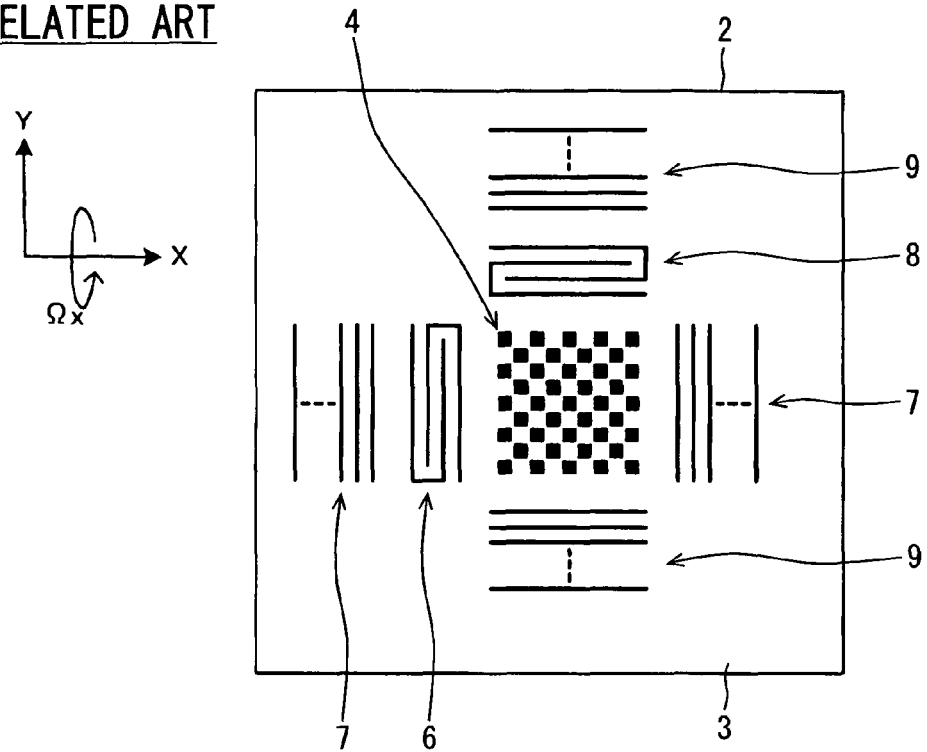
FIG. 6 is a diagram illustrating a surface acoustic wave angular velocity sensor.
Figure 7:
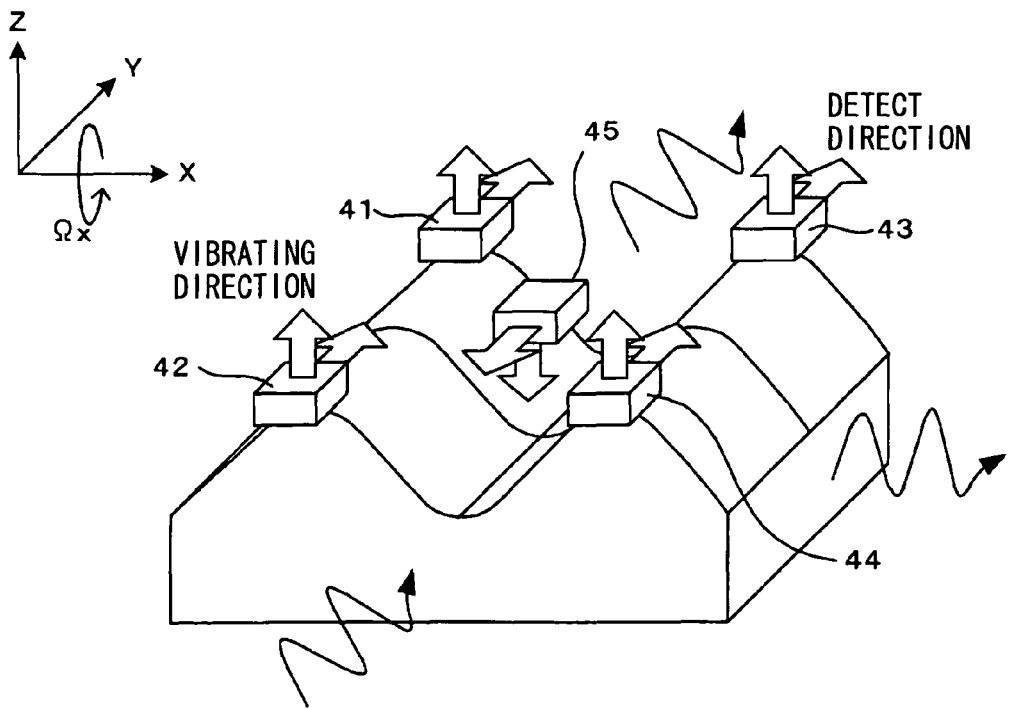
FIG. 7 is a diagram illustrating a relation among oscillation of a standing wave, movement of perturbation weights and Coriolis force due to an angular velocity.

As shown in FIG. 1, the angular velocity detection apparatus of the present embodiment includes a surface acoustic wave (SAW) angular velocity sensor 2, an oscillator 10, a divider 12, a first amplifier circuit 14, a second amplifier circuit 16, a phase shifter 18, and a synchronous detection circuit 20. The surface acoustic wave angular velocity sensor 2, which is simply referred to hereinafter as an augural velocity sensor, may have a configuration generally similar to that shown in FIG. 6. The oscillator 10 generates a high-frequency signal used as a basis for forming a driving signal and a reference signal. The divider 12 divides the signal outputted from the oscillator 10 into two signals, which are called a first divided signal and a second divided signal. The first amplifier circuit 14 amplifies the first divided signal to a first predetermined level and outputs the amplified first divided signal as a driving signal for the SAW angular velocity sensor 2. The second amplifier circuit 16 amplifies the second divided signal to a second predetermined level. The phase shifter 18 delays the amplified second divided signal, which is outputted from the second amplifier circuit 16, by a predetermined phase to create a reference signal for synchronous detection. The synchronous detection circuit 20 is for synchronous detection of an output signal from the angular velocity sensor 2, more particularly, from a sensing electrode 8 by using the reference signal.

The angular velocity detection apparatus further includes the driving signal input switch SW1 and the reference signal input SW2. The SW1 is provided in a driving signal path for inputting the driving signal from the first amplifier circuit 14 to the angular velocity sensor 2, more particularly to a driving electrode 6 of the angular velocity sensor 2. The driving signal input switch SW1 connects and disconnects the driving signal path by being switched on and off. The reference signal input SW2 is provided in a reference signal path for inputting the reference signal from the phase shifter 18 to the synchronous detection circuit 20. The reference signal input SW2 connects and disconnects the reference signal path by being switched on and off.

Figure 2:
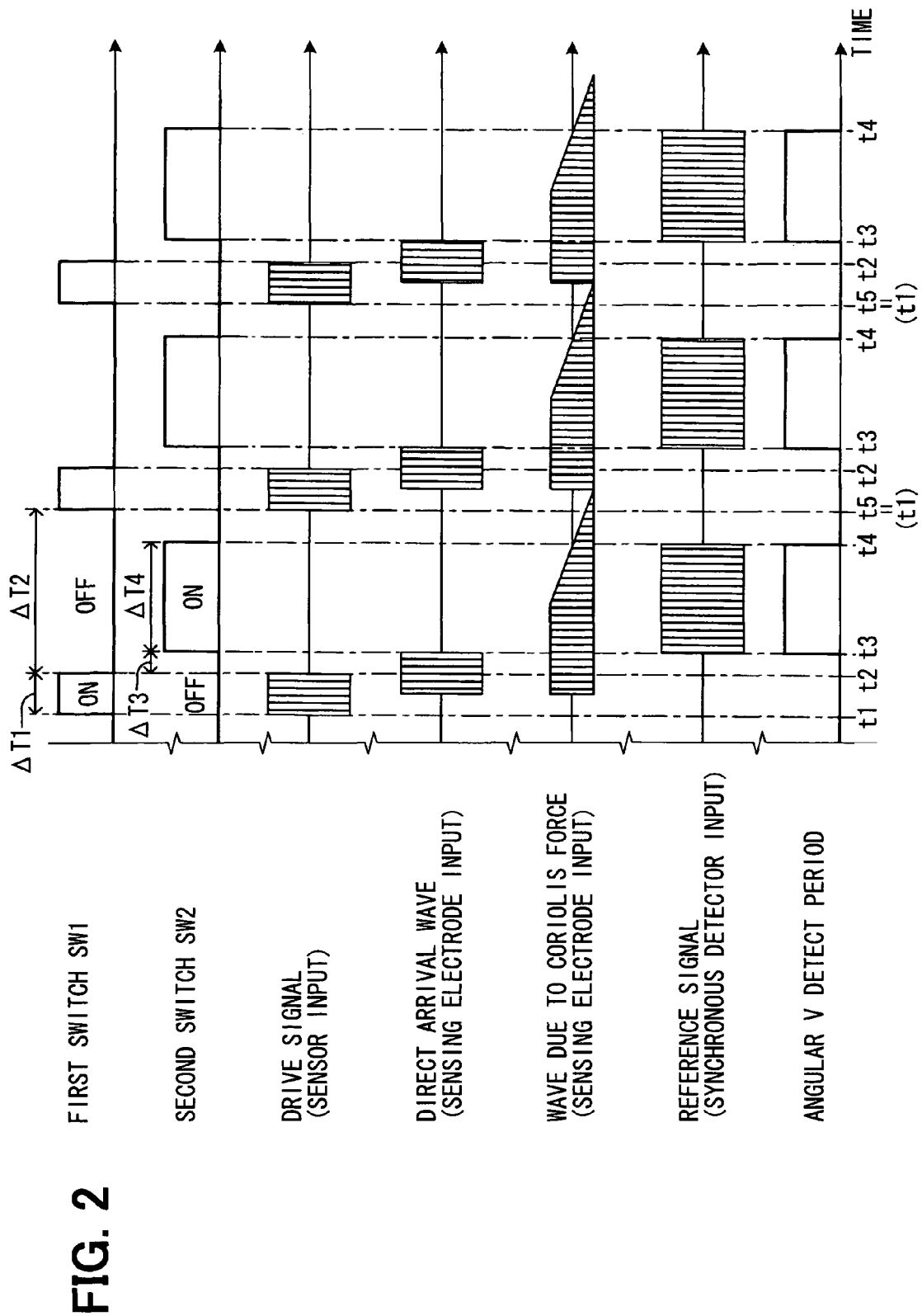
FIG. 2 is a timing chart illustrating an operation of an angular velocity detection apparatus in accordance with the first embodiment.

Each of the switches SW1, SW2 is alternately turned on and off in a predetermined switching cycle in accordance with a switching signal outputted from a timing control circuit 22. That is, as shown in FIG. 2, the timing control circuit 22 outputs a switching signal to the switch SW1, so that the switch SW1 is in ON for a constant period ΔT1 (e.g., 1 μs) from t1 to t2, and is in OFF for a constant period ΔT2 (e.g., 5 μs) from a time of t2 to t5. Thereby, the timing control circuit 22 turns on the switch SW1 for only the predetermined period (ΔT1) per the predetermined cycle (ΔT1+ΔT2).

The timing control circuit 22 outputs a switching signal to the switch SW2. Accordingly, the switch SW2 is switched on at a time t3, which is after a predetermined period ΔT3 from the time t2 at which the switch 1 is switched off. Then, after a predetermined period ΔT4, the switch SW2 is switched off at a time t4. The predetermined period ΔT4 is shorter than the predetermined period ΔT2. Thus, during the switch SW 1 is in OFF, the timing control circuit 22 turns on the SW2 for only the predetermined period ΔT4.

When the input of the driving signal to the driving electrode 6 of the angular velocity sensor 2 vibrates the driving electrode 6, the perturbation weights 4 of the angular velocity sensor 2 is vibrated, and further, the vibration of the driving electrode 6 directly propagates to the sensing electrode 8 as the direct arrival wave. Accordingly, the sensing electrode 8 outputs a signal component that corresponds to the direct arrival wave. As shown in FIG. 2, the signal component corresponding to the detected direct arrival wave is delayed by a constant period (i.e., delay time ΔT3 exemplified in FIG. 2), which is determined from a wave propagation distance between the driving electrode 6 and the sensing electrode 8. Thus, when the input of the driving signal to the driving electrode 6 is stopped, the signal component corresponding to the direct arrival wave vanishes immediately after the delay time ΔT3.

Regarding the Coriolis force causing wave due to the angler velocity of the angular velocity sensor, on the other hand, the Coriolis force causing wave is kept to be generated after the stop of the input of the driving signal to the driving electrode 6, as long as multiple reflections by the reflectors 7 maintain the first standing wave to stay.

In the present embodiment, the switch SW1 is cyclically turned off to interrupt the input of the driving signal to the angular velocity sensor 2, thereby to create a time span during which the direct arrival wave from the driving electrode 6 is not inputted to the sensing electrode 8. During the time span, the switch SW2 is turned on for the constant period ΔT4, so that the reference signal is inputted to the synchronous detection circuit 20 and the synchronous detection circuit 20 performs the synchronous detection.

Accordingly, the angular velocity detection apparatus of the present embodiment can detect the Coriolis force causing wave generated in the angular velocity sensor 2 time-separately from the direct arrival wave, which propagates directly from the driving electrode 6 to the sensing electrode 8. Thus, it is possible to improve the angular velocity detection accuracy.

According to the present embodiment, the oscillator 10 and the first amplifier circuit 14 can function as a driving signal generation means or unit. The oscillator 10, the second amplifier circuit 16, and the phase shifter 18 can function as a reference signal generation means or unit. The driving signal input switch SW1 can function as a first switching means or unit. The reference signal input switch SW2 can function as a second switching means or unit. The synchronous detection circuit 20 can function as a synchronous detection means or unit. The timing control circuit 22 can faction as a switch signal generation means or unit.

Second Embodiment

Figure 3:
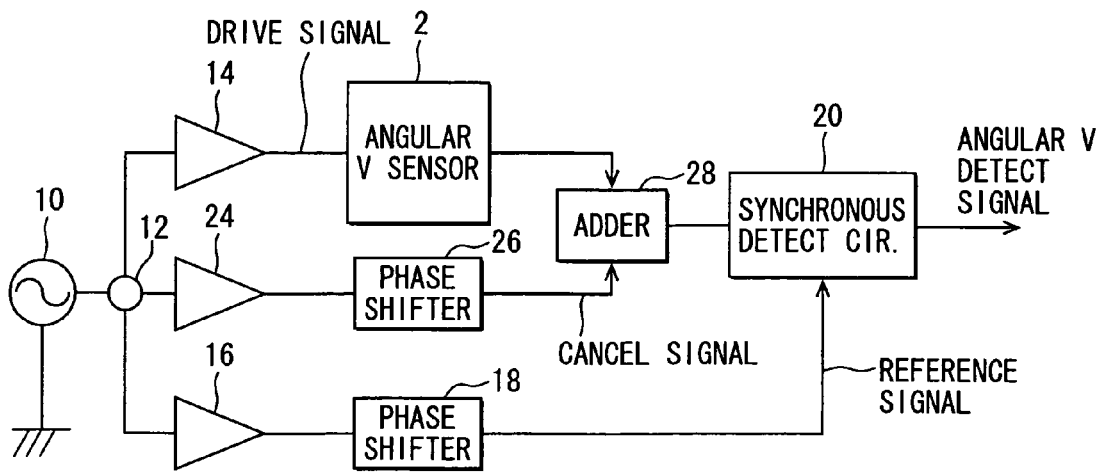
FIG. 3 is a block diagram illustrating an angular velocity detection apparatus in accordance with a second embodiment.

FIG. 3 is a block diagram illustrating an angular velocity detection apparatus in accordance with a second embodiment.

As shown in FIG. 3, the angular velocity detection apparatus of the present embodiment includes an angular velocity sensor 2, an oscillator 10, a divider 12, a first amplifier circuit 14, a second amplifier circuit 16, a third amplifier circuit 24, phase shifter 18, 26, a synchronous detection circuit 20, and an adder circuit 28 The first amplifier circuit 14 is used for generating a driving signal. The sensing electrode 8 and the phase shifter 18 are used for generating a reference signal.

The divider 12 divides a signal outputted from the oscillator 10 into three signals for three lines. The three divided signals are respectively outputted to the first, second and third amplifier circuits 14, 16 and 24.

The third amplifier circuit 24 is used to create a signal (i.e., cancel signal) for canceling a signal component representative of an unwanted wave, which is the scattered wave or the direct arrival wave and propagates to the sensing electrode 8 of the angular velocity sensor 2 when the driving signal from the first amplifier circuit 14 is consciously inputted to the driving electrode 6 of the angular velocity sensor 2. The third amplifier circuit 24 amplifies the signal from the oscillator 10 to such a level that amplitude of the amplified signal is generally equal to that of the signal component representative of the unwanted wave. The signal component representative of the unwanted wave is referred also as an unwanted wave signal component.

The signal outputted from the third amplifier circuit 24 is inputted to the phase shifter and delayed by a pre-set phase, and thereby converted into a signal whose phase is different in 180 degrees from the phase of the unwanted wave signal component. In other words, the converted signal and the signal component representing the unwanted wave are in anti-phase.

A configuration of the angular velocity sensor 2 uniquely constrains the unwanted wave, which propagates and is inputted to the sensing electrode 8 when the driving signal is continuously inputted from the first amplifier circuit 14 to the driving electrode 6 of the angular velocity sensor 2. Thus, it is possible to specify the amplitude and the phase of the unwanted wave. Hence, the angular velocity detection apparatus of the present embodiment can create the cancel signal for canceling the unwanted wave signal component, by utilizing the third amplifier circuit 24 and the phase shifter 26.

The signal outputted from the phase shifter 26 is inputted as the cancel signal to the adder circuit 28. The adder circuit 28 adds the cancel signal to the output signal from the sensing electrode 8 of the angular velocity sensor 2. As a result, the adder circuit 28 removes the signal component representative of the unwanted wave (i.e., the scattered wave and the direct arrival wave) from the output signal from the sensing electrode 8 of the angular velocity sensor 2. The adder circuit 28 outputs a signal in which the unwanted wave signal component (i.e., scattered wave signal component and direct arrival wave signal component) is removed.

The signal in which the unwanted wave signal component is removed is inputted to the synchronous detection circuit 20. The synchronous detection circuit 20 performs the synchronous detection using the reference signal, and thereby generates a detection signal representative of the angular velocity. According to the above manners, the signal component representative of the Coriolis force causing wave due to the angular velocity is inputted to the synchronous detection circuit 20 while the unwanted wave signal component is not inputted to the synchronous detection circuit 20. Therefore, it is possible to prevent the synchronous detection circuit 20 from being saturated by the unwanted wave signal component. It is possible to improve accuracy of angular velocity detection using synchronous detection.

According to the present embodiment, the oscillator 10, the third amplifier circuit 24 and the phase shifter 26 can function as a cancel signal generation means or unit. The adder circuit 28 can function as an adder means or unit.

Third Embodiment

Figure 4:
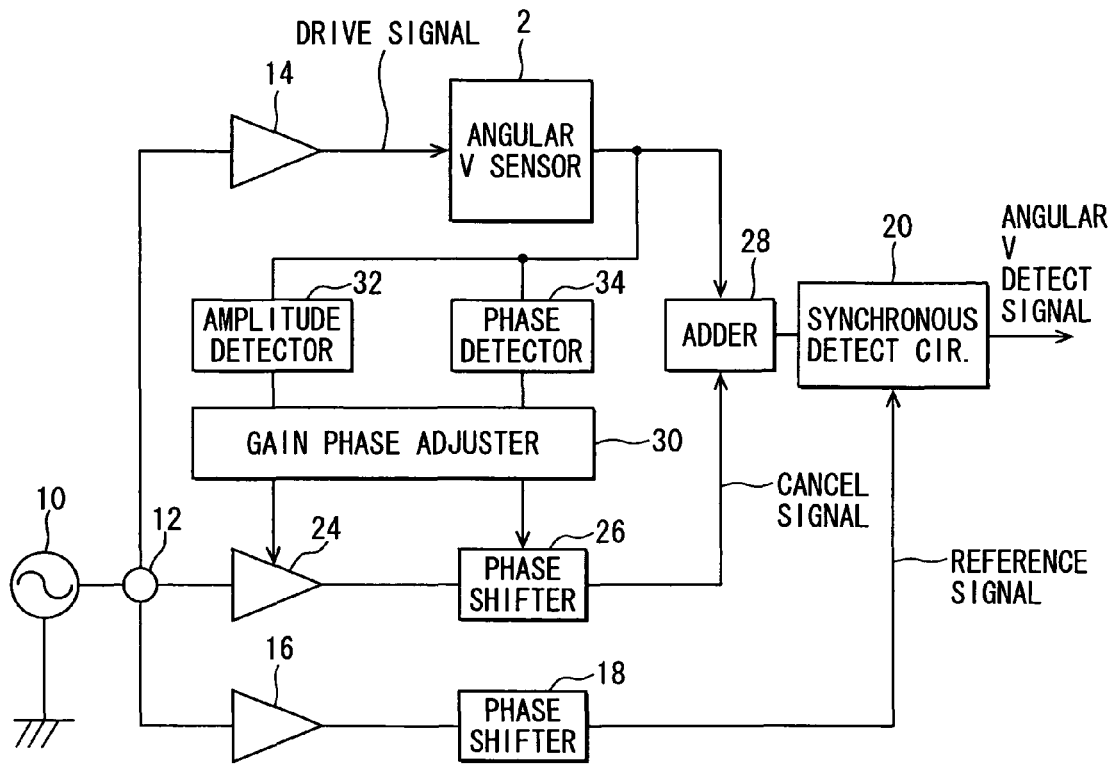
FIG. 4 is a block diagram illustrating an angular velocity detection apparatus in accordance with a third embodiment.

FIG. 4 is a block diagram illustrating an angular velocity detection apparatus in accordance with a third embodiment.

As shown in FIG. 4, the angular velocity detection apparatus of the present embodiment, compared to that of the second embodiment, further includes an amplitude detection circuit 32, a phase detection circuit 34, and a gain phase-shift adjustment circuit 30.

The amplitude detection circuit 32 detects amplitude of the output signal from the sensing electrode 8 of the angular velocity sensor 2. The phase detection circuit 34 detects a phase of the output signal from the sensing electrode 8 of the angular velocity sensor 2.

The gain phase-shift adjustment circuit 30 detects the output signal from the angular velocity sensor 2, i.e., detects the unwanted wave signal component when the angular velocity sensor 2 is not subjected to angular velocity. Based on a detection result of the output signal, the gain phase-shift adjustment circuit 30 automatically adjusts a gain of the third amplifier circuit 24 and a phase-shift of the phase shifter 26. Thereby, the gain phase-shift adjustment circuit 30 sets the amplitude and the phase of the cancel signal, which is to be inputted to the adder circuit 28, such that the cancel signal and the unwanted wave signal component are generally equal in amplitude and are generally opposite in phase.

According to the angular velocity detection apparatus of the present embodiment, the operation of the gain phase-shift adjustment circuit 30 automatically relates the amplitude and phase of the cancel signal to those of the unwanted wave signal component. The angular velocity detection apparatus therefore can detect the angular velocity with higher accuracy.

Further, since it is possible to automatically adjust properties of the cancel signal, it is possible to simplify adjustment work for an angular velocity detection apparatus.

In the present embodiment, it is necessary to perform the operation of the gain phase-shift adjustment circuit 30 when the angular velocity sensor 2 is not subjected to an angular velocity. Thus, the angular velocity detection apparatus may be configured such that a user can manually allow the operation of the gain phase-shift adjustment circuit 30. Alternatively, the operation of the gain phase-shift adjustment circuit 30 may automatically performed when the angular velocity sensor 2 is not subjected to an angular velocity, e.g., when a movable object to which the angular velocity detection apparatus is mounted stops moving.

According to the present embodiment, the amplitude detection circuit 32 and the phase detection circuit 34 can function as an amplitude phase detection means or unit. The gain phase-shift adjustment circuit 30 can function as a cancel signal property setting means or unit.

Fourth Embodiment

Figure 5:
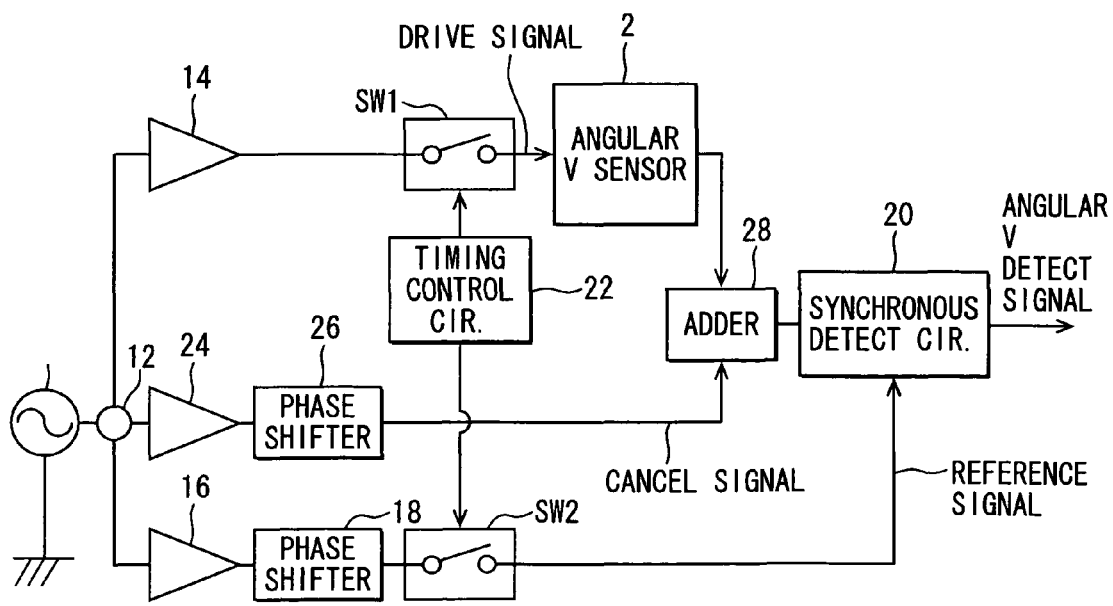
FIG. 5 is a block diagram illustrating an angular velocity detection apparatus in accordance with a fourth embodiment.

FIG. 5 is a block diagram illustrating an angular velocity detection apparatus in accordance with a fourth embodiment.

As shown in FIG. 5, the angular detection apparatus of the present embodiment, compared to that of the first embodiment shown in FIG. 1, further includes a third amplifier circuit 24, a phase shifter 26 and an adder circuit 28 (cf. second embodiment). The divider 12 divides the signal from the oscillator 10 into three signals for three lines. The there signal are respectively inputted to the first, second and third amplifier circuits 14, 16, 24.

According to the first embodiment, the switch SW1 is provided in the signal path for inputting the driving signal to the angular velocity sensor 2, and the switch SW2 is provided in the signal path for inputting the reference signal to the synchronous detection circuit 20. Further, the timing control circuit 22 controls the input timing of the driving signal and the reference signal. In the first embodiment, it is possible to minimize error due to the signal component representative of the direct arrival wave, which propagates from the driving electrode 6 to the sensing electrode 8 in the angular velocity sensor 2.

However, if an unwanted wave such as the scattered wave is inputted to the sensing electrode 8 of the angular velocity sensor 2 during the switch SW2 is in ON and the synchronous detection circuit 20 is performing synchronous detection, the unwanted wave may reduce detection accuracy of angular velocity.

In view of the above, the angular velocity detection apparatus of the present embodiment further includes, compared to that of the first embodiment, the third amplifier circuit 24, the phase shifter 26 and the adder circuit 28. Hence, the third amplifier circuit 24 and the phase shifter 26 create a cancel signal for canceling a signal component representative of the unwanted wave that is inputted to the sensing electrode 8 in the ON state of the switch SW2. The adder circuit 28 adds the created cancel signal to the output signal from the angular velocity sensor 2. Thereby, the unwanted wave signal component is removed from the signal that is inputted to the synchronous detection circuit 20 when the synchronous detection is being performed.

According to the angular velocity detection apparatus of the present embodiment, it is possible to minimize influence of the scattered wave on reduction of angular velocity detection accuracy while also minimizing influence of the direct arrival wave. The angular velocity detection apparatus of the present embodiment can therefore detect angular velocity with higher accuracy than that of the first and second embodiments.

The angular detection apparatus of the present embodiment may further includes, in a manner similar to that of the third embodiment, the amplitude detection circuit 32, the phase detection circuit 34 and the gain phase-shift adjustment circuit 30, in order to automatically adjust the amplitude and the phase of the cancel signal created by the third amplifier circuit 24 and the phase shifter 26.

The above embodiments can be modified and extended in various ways.

For example, in the above embodiments, the driving signal, the reference signal and the cancel signal are created through level adjustment or phase adjustment of the signal outputted from the common oscillator 10. Alternatively, each or some of the above signals may be created using a dedicated oscillator.

The above embodiments and modifications have the following aspects.

According to a first aspect, an angular velocity detection apparatus can be configured as follows. The angular velocity detection apparatus includes a surface acoustic wave angular velocity sensor 2, which has: a piezoelectric substrate 3 configured to allow a surface acoustic wave to propagate thereon; multiple perturbation weights 4 disposed on the piezoelectric substrate 3; a driving electrode 6 disposed on the piezoelectric substrate 3 and configured to oscillate in accordance with a driving signal to vibrate the perturbation weights 4 with a first vibration; a sensing electrode 8 disposed on the piezoelectric substrate 3 and configured to sense a second vibration of the perturbation weights 4, the second vibration being caused by a Coriolis force due to an angular velocity; and a first reflector 7, 9 and a second reflector 7, 9 between which the perturbation weights 4 and the driving electrode 6 are disposed. The angular velocity detection apparatus further includes: a driving signal generation unit 10, 14 configured to generate the driving signal; a synchronous detection unit 20 configured to synchronously detect an output signal from the sensing electrode 8 by using a reference signal, thereby to detect an angular velocity of the surface acoustic wave angular velocity sensor; a reference signal generation unit 10, 16, 18 configured to generate the reference signal; a first switching unit SW1 configured to connect and disconnect a first signal path for inputting the driving signal from the driving signal generation unit 10, 14 to the driving electrode 6 by being switched on and off, respectively; a second switching unit SW2 configured to connect and disconnect a second signal path for inputting the reference signal from the reference signal generation unit 10, 16, 18 to the synchronous detection unit 20 by being switched on and off, respectively; and a switching signal generation unit 22. The switching signal generation unit generates: a first switching signal to cyclically switch on and off the first switching unit SW1 at predetermined time intervals; and a second switching signal to (i) switch on the second switching unit SW2 when a direct arrival wave from the driving electrode 6 is un-inputted to the sensing electrode 8 and (ii) switch off the second switching unit SW2 when the direct arrival wave from the driving electrode 6 is inputted to the sensing electrode 8.

According to the above angular velocity detection apparatus, in a case where the driving signal is periodically inputted and un-inputted to the driving electrode 6 by switching on and off the first switching unit SW1, the direct arrival wave to be inputted to the sensing electrode 8 vanishes immediately after the input of the driving signal is interrupted. A Coriolis force causing wave due to the angular velocity, on the other hand, is kept to be generated even if the input of the driving signal is interrupted, as long as multiple reflections by the first and second reflectors 7, 9 maintain a standing wave, which is originally generated by the input of the driving signal.

That is, the periodical input and un-input of the driving signal to the surface acoustic wave angular velocity sensor 2 via the first switching unit SW1 creates a period during which the direct arrival wave is not inputted to the sensing electrode 8. During the above period, the second switching unit SW2 is switched on and the reference signal is inputted to the synchronous detection unit 20. Thereby, the synchronous detection unit 20 can synchronously measure the output signal from the sensing electrode 8 properly.

Accordingly, the angular velocity detection apparatus can detects the Coriolis force causing wave generated in the acoustic surface wave angular velocity sensor 2, time-divisionally from the direct arrival wave, which propagates directly from the driving electrode 6 to the sensing electrode 8. Thereby, it is possible to improve detection accuracy of angular velocity.

In the above, the performing of the synchronous detection at a time when the direct arrival wave is un-inputted to the sensing electrode 8 is enough to prevent detection accuracy of angular velocity from being reduced owing to the direct arrival wave. Thus, it is not necessary to continuously switch on the second switching unit SW2 during the direct arrival wave is being un-inputted to the sensing electrode 8.

In view of the above, the angular velocity detection apparatus may be configured as follows. The switching signal generation unit 22, by generating the second switching signal, causes the second switching unit SW2 to be in ON during only a part of a period, the period between a first time and a second time. The first time is after a direct arrival wave vanish period from a time when the first switching unit SW1 is switched off, the direct arrival wave vanish period being a period that is required to vanish the direct arrival wave. The second time is a time when a next direct arrival wave is inputted to the sensing electrode 8. The synchronous detection unit 20 configured to synchronously detect the output signal from the sensing electrode 8 during the part of the period.

According to the above angular velocity detection apparatus, the first switching unit SW1 is cyclically switched on and off to create the period during which the direct arrival wave is un-inputted to the sensing electrode 8. Further, during the part of the period, the second switching unit SW2 is switched on and the synchronous detection unit 20 performs the synchronous detection. In the above configuration, it is possible to minimize angular velocity detection error caused by the direct arrival wave. However, if an unwanted wave such as a scattered wave is inputted to the sensing electrode 8 of the angular velocity sensor 2 during the second switching unit SW2 is in ON and the synchronous detection unit 20 is performing synchronous detection, the unwanted wave may reduce detection accuracy of angular velocity. That is, the output signal from the sensing electrode 8 may contains an unwanted signal component representative of an unwanted wave on the piezoelectric substrate 3.

In view of the above, the angular velocity detection apparatus may be configured to further include: a cancel signal generation unit 10, 24, 26 configured to generates a cancel signal, wherein the cancel signal and the unwanted signal component are generally opposite in phase and are generally equal in amplitude; and an adder unit 28 configured to add the cancel signal to the output signal, thereby to produce an added signal. The added signal is inputted to the synchronous detection unit 20 instead of the output signal.

According to the above configuration, a synchronous detection execution time in the synchronous detection unit 20 can be set within a period when the direct arrival wave is un-inputted from driving electrode 6 to the sensing electrode 8. Further, even if the unwanted wave such as the scattered wave is inputted to the sensing electrode 8 in the synchronous detection time, the unwanted wave signal component is removed from the output signal from the sensing electrode 8, and then inputted to the synchronous detection unit 20. It is therefore possible to further improve detection accuracy of the angular velocity by using the synchronous detection unit 20.

The cancel signal can be set through measurement of the amplitude and the phase of a signal (i.e., the unwanted wave signal component) that is inputted to the synchronous detection unit 20 from the sensing electrode 8 when the surface acoustic wave angular velocity sensor is not subjected to an angular velocity (i.e., angular velocity=0) and when the second switching unit SW2 is in ON. Based on the measurement result, the cancel signal is set so as to cancel the unwanted wave signal component.

According to a second aspect of the above embodiments and modifications, an angular velocity detection apparatus can be configured as follows. The angular velocity detection apparatus includes a surface acoustic wave angular velocity sensor 2, which has: a piezoelectric substrate 3 configured to allow a surface acoustic wave to propagate thereon; multiple perturbation weights 4 disposed on the piezoelectric substrate 3; a driving electrode 6 disposed on the piezoelectric substrate 3 and configured to oscillate in accordance with a driving signal to vibrate the perturbation weights 4 with a first vibration; a sensing electrode 8 disposed on the piezoelectric substrate 3 and configured to sense a second vibration of the perturbation weights 4, the second vibration being caused by a Coriolis force due to an angular velocity; and a first reflector 7, 9 and a second reflector 7, 9 between which the perturbation weights 4 and the driving electrode 6 are disposed. The angular velocity detection apparatus further includes: a driving signal generation unit 10, 14 configured to generate the driving signal; a cancel signal generation unit 10, 24, 26 configured to generate a cancel signal, wherein an unwanted signal component of an output signal from the sensing electrode 8 and the cancel signal and are generally opposite in phase and are generally equal in amplitude; an adder unit 28 configured to configured add the cancel signal to the output signal, thereby to produce an added signal; a synchronous detection unit 20 configured to synchronously detect the added signal by using a reference signal, and thereby to detect an angular velocity of the surface acoustic wave angular velocity sensor 2; and a reference signal generation unit 10, 16, 18 configured to generate the reference signal.

In a conventional manner, a driving signal is continuously inputted to a driving electrode of an SAW angular velocity sensor to oscillate a driving electrode and perturbation weights. In this conventional manner, an unwanted wave containing a scattered wave and a direct arrival wave is seamlessly inputted to a sensing electrode, and thus, even if an output signal from the sensing electrode contains a component indicative of a Coriolis causing wave resulting from an angular velocity, the component (i.e., an angular velocity) cannot be measured with high accuracy.

However, according to the present embodiments and modifications, since a ratio of amplitude and phase of the unwanted signal component to those of the driving signal can be uniquely determined through a configuration of a surface acoustic wave angular velocity sensor, it is possible to specify the ratio.

In view of the above, according to the angular velocity detection apparatus of the second aspect, the cancel signal generation unit 10, 24, 26 generates the cancel signal whose amplitude and phase are respectively equal and opposite to a signal component representative of the unwanted wave containing the direct arrival wave and the scattered wave. The adder unit 28 adds the cancel signal to the output signal to cancel the signal component representative of the unwanted wave.

Accordingly, of the signal components representative of the Coriolis force causing wave and the unwanted wave, only the signal component representative of the Coriolis force causing wave is inputted to the synchronous detection unit 20. It is therefore possible to prevent the synchronous detection unit 20 from being saturated and possible to improve detection accuracy of angular velocity by synchronous detection.

According to the above sensor apparatuses of the first and second aspects, the unwanted signal component can be removed from a signal to be inputted to the synchronous detection unit 20 from the sensing electrode 8 by adding the cancel signal to the output signal from the sensing electrode 8. Thus, a property such as amplitude and phase of the cancel signal generated by the cancel signal generation unit 10, 24, 26 can be set in accordance with a configuration of the surface acoustic wave angular velocity sensor and a property such as amplitude and phase of the driving signal A property such as amplitude and phase of the unwanted wave signal component can also vary according to an inherent characteristic, a usage state, a change in characteristic with time etc. of the surface acoustic wave angular velocity sensor 2. Thus, in some cases, it may be preferable to set the property such as amplitude and phase of the cancel signal sensor by sensor, and it may be more preferable to update the property according to usage.

In view of the above, the angular velocity detection apparatus may be configured to further include: an amplitude phase detection unit 32, 34 configured to detect an amplitude and a phase of the output signal from the sensing electrode 8; and a cancel signal property setting unit 30 configured such that, when the surface acoustic wave angular velocity sensor 2 is not subjected to the angular velocity, the cancel signal property setting unit 30 (i) detects the amplitude and the phase of the output signal from the sensing electrode 8 through the amplitude phase detection unit 32, 34 and (ii) sets the amplitude and the phase of the cancel signal to be generated by the cancel signal generation unit 10, 24, 26, based on the detected amplitude and the detected phase of the output signal.

According to the above configuration, it is possible to relate the amplitude and the phase of the cancel signal generated by the cancel signal generation unit 10, 24, 26 to those of the unwanted signal component to be removed. It is therefore possible to detect angular velocity with higher accuracy.

Further, since the cancel signal property setting unit 30 enables automatic adjustment of the property of the cancel signal generated by the cancel signal generation unit 10, 24, 26, it is possible to simplify adjustment work for the angular velocity detection apparatus.

While the invention has been described above with reference to various embodiments thereof, it is to be understood that the invention is not limited to the above described embodiments and construction. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. An angular velocity detection apparatus comprising:
a surface acoustic wave angular velocity sensor including:
a piezoelectric substrate configured to allow a surface acoustic wave to propagate thereon;
a plurality of perturbation weights disposed on the piezoelectric substrate;
a driving electrode disposed on the piezoelectric substrate and configured to oscillate in accordance with a driving signal to vibrate the perturbation weights with a first vibration;
a sensing electrode disposed on the piezoelectric substrate and configured to sense a second vibration of the perturbation weights, the second vibration being caused by a Coriolis force due to an angular velocity; and
a first reflector and a second reflector between which the plurality of perturbation weights and the driving electrode are disposed;
a driving signal generation unit configured to generate the driving signal;
a synchronous detection unit configured to synchronously detect an output signal from the sensing electrode by using a reference signal;
a reference signal generation unit configured to generate the reference signal;
a first switching unit configured to connect and disconnect a first signal path for inputting the driving signal from the driving signal generation unit to the driving electrode by being switched on and off, respectively;
a second switching unit configured to connect and disconnect a second signal path for inputting the reference signal from the reference signal generation unit to the synchronous detection unit by being switched on and off, respectively; and
a switching signal generation unit configured to generates:
a first switching signal to cyclically switch on and off the first switching unit at predetermined time intervals; and
a second switching signal to (i) switch on the second switching unit when a direct arrival wave from the driving electrode is un-inputted to the sensing electrode and (ii) switch off the second switching unit when the direct arrival wave from the driving electrode is inputted to the sensing electrode.

2. The angular velocity detection apparatus according to claim 1, wherein
the switching signal generation unit, by generating the second switching signal, causes the second switching unit to be in ON during only a part of a period, the period being between a first time and a second time;
the first time is after a direct arrival wave vanish period from a time when the first switching unit is switched off, the direct arrival wave vanish period being a period that is required for the direct arrival wave to vanish;
the second time is a time when a next direct arrival wave is inputted to the sensing electrode; and
the synchronous detection unit configured to synchronously detect the output signal from the sensing electrode during the part of the period.

3. The angular velocity detection apparatus according to claim 1, wherein the output signal from the sensing electrode contains an unwanted signal component representative of an unwanted wave on the piezoelectric substrate,
the angular velocity detection apparatus further comprising:
a cancel signal generation unit configured to generates a cancel signal, wherein the cancel signal and the unwanted signal component are generally opposite in phase and are generally equal in amplitude; and
an adder unit configured to add the cancel signal to the output signal, thereby to produce an added signal,
wherein:
the added signal is inputted to the synchronous detection unit instead of the output signal.

4. An angular velocity detection apparatus comprising:
a surface acoustic wave angular velocity sensor including:
a piezoelectric substrate configured to allow a surface acoustic wave to propagate thereon;
a plurality of perturbation weights disposed on the piezoelectric substrate;
a driving electrode disposed on the piezoelectric substrate and configured to oscillate in accordance with a driving signal to vibrate the perturbation weights with a first vibration;
a sensing electrode disposed on the piezoelectric substrate and configured to sense a second vibration of the perturbation weights, the second vibration being caused by a Coriolis force due to an angular velocity; and
a first reflector and a second reflector between which the plurality of perturbation weights and the driving electrode are disposed;
a driving signal generation unit configured to generate the driving signal;
a cancel signal generation unit configured to generate a cancel signal, wherein an unwanted signal component of an output signal from the sensing electrode and the cancel signal and are generally opposite in phase and are generally equal in amplitude;
an adder unit configured to configured add the cancel signal to the output signal, thereby to produce an added signal;
a synchronous detection unit configured to synchronously detect the added signal by using a reference signal; and
a reference signal generation unit configured to generate the reference signal.

5. The angular velocity detection apparatus according to claim 4, further comprising:
an amplitude phase detection unit configured to detect an amplitude and a phase of the output signal from the sensing electrode; and
a cancel signal property setting unit,
wherein:
when the surface acoustic wave angular velocity sensor is not subjected to the angular velocity, the cancel signal property setting unit
(i) detects the amplitude and the phase of the output signal from the sensing electrode though the amplitude phase detection unit and
(ii) sets the amplitude and the phase of the cancel signal to be generated by the cancel signal generation unit, based on the detected amplitude and the detected phase of the output signal.

6. The angular velocity detection apparatus according to claim 2, wherein the output signal from the sensing electrode contains an unwanted signal component representative of an unwanted wave on the piezoelectric substrate, the angular velocity detection apparatus further comprising:

a cancel signal generation unit configured to generates a cancel signal, wherein the cancel signal and the unwanted signal component are generally opposite in phase and are generally equal in amplitude; and an adder unit configured to add the cancel signal to the output signal, thereby to produce an added signal, wherein:

the added signal is inputted to the synchronous detection unit instead of the output signal.

7. The angular velocity detection apparatus according to claim 3, further comprising:

an amplitude phase detection unit configured to detect an amplitude and a phase of the output signal from the sensing electrode; and a cancel signal property setting unit, wherein:

when the surface acoustic wave angular velocity sensor is not subjected to the angular velocity, the cancel signal property setting unit (i) detects the amplitude and the phase of the output signal from the sensing electrode though the amplitude phase detection unit and (ii) sets the amplitude and the phase of the cancel signal to be generated by the cancel signal generation unit, based on the detected amplitude and the detected phase of the output signal.

8. The angular velocity detection apparatus according to claim 6, further comprising:

an amplitude phase detection unit configured to detect an amplitude and a phase of the output signal from the sensing electrode; and a cancel signal property setting unit, wherein:

when the surface acoustic wave angular velocity sensor is not subjected to the angular velocity, the cancel signal property setting unit (i) detects the amplitude and the phase of the output signal from the sensing electrode though the amplitude phase detection unit and (ii) sets the amplitude and the phase of the cancel signal to be generated by the cancel signal generation unit, based on the detected amplitude and the detected phase of the output signal.

* * * * *